(12) United States Patent
Schmidt et al.

(10) Patent No.: US 8,508,179 B2
(45) Date of Patent: Aug. 13, 2013

(54) SEPARATELY EXCITED ELECTRICAL SYNCHRONOUS MACHINE, AND METHOD FOR OPERATING A SYNCHRONOUS MACHINE

(75) Inventors: Josef Schmidt, Graben-Neudorf (DE); Matthias Hauck, Schwetzingen (DE); Marek Lewandowski, Karlsruhe (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 321 days.

(21) Appl. No.: 13/003,466

(22) PCT Filed: May 9, 2009

(86) PCT No.: PCT/EP2009/003306
§ 371 (c)(1),
(2), (4) Date: Jan. 10, 2011

(87) PCT Pub. No.: WO2010/003474
PCT Pub. Date: Jan. 14, 2010

(65) Prior Publication Data
US 2011/0121773 A1 May 26, 2011

(30) Foreign Application Priority Data
Jul. 9, 2008 (DE) .......................... 10 2008 032 210

(51) Int. Cl.
*H02P 6/08* (2006.01)
*H02P 1/46* (2006.01)

(52) U.S. Cl.
CPC ........................................ *H02P 1/46* (2013.01)
USPC ........... 318/716; 318/717; 318/718; 318/719; 318/720

(58) Field of Classification Search
CPC .......... H02P 1/46; H02P 25/021; H02K 19/12
USPC ........................................ 318/716, 717–720
See application file for complete search history.

(56) References Cited

U.S. PATENT DOCUMENTS

| | | | | | |
|---|---|---|---|---|---|
| 4,238,719 | A | * | 12/1980 | Bourbeau | 318/716 |
| 4,426,585 | A | * | 1/1984 | Bigalke | 290/38 B |
| 4,712,050 | A | * | 12/1987 | Nagasawa et al. | 318/400.04 |
| 4,726,738 | A | * | 2/1988 | Nakamura et al. | 417/22 |
| 6,046,460 | A | * | 4/2000 | Mertins | 250/504 H |

(Continued)

FOREIGN PATENT DOCUMENTS

| | | |
|---|---|---|
| CN | 1 835 351 | 9/2006 |
| EP | 1 757 480 | 2/2007 |

OTHER PUBLICATIONS

International Search Report, issued in corresponding International Application No. PCT/EP2009/003306, 2011.
Written Opinion of the International Searching Authority, issued in corresponding International Application No. PCT/EP2009/003306, 2011.

(Continued)

*Primary Examiner* — Bentsu Ro
*Assistant Examiner* — David Luo
(74) *Attorney, Agent, or Firm* — Kenyon & Kenyon LLP

(57) ABSTRACT

In a separately excited electrical synchronous machine, and a method for operating a synchronous machine, coil windings, in particular in the form of excitation coils, are disposed on the rotor, the electrical supply of the coil windings being achieved with the aid of an inductive rotation transmitter, whose secondary winding is connected to the rotor and whose primary winding, which is inductively coupled to the secondary winding, is stationary, especially connected to the stator of the synchronous machine.

23 Claims, 2 Drawing Sheets

Figure 1:
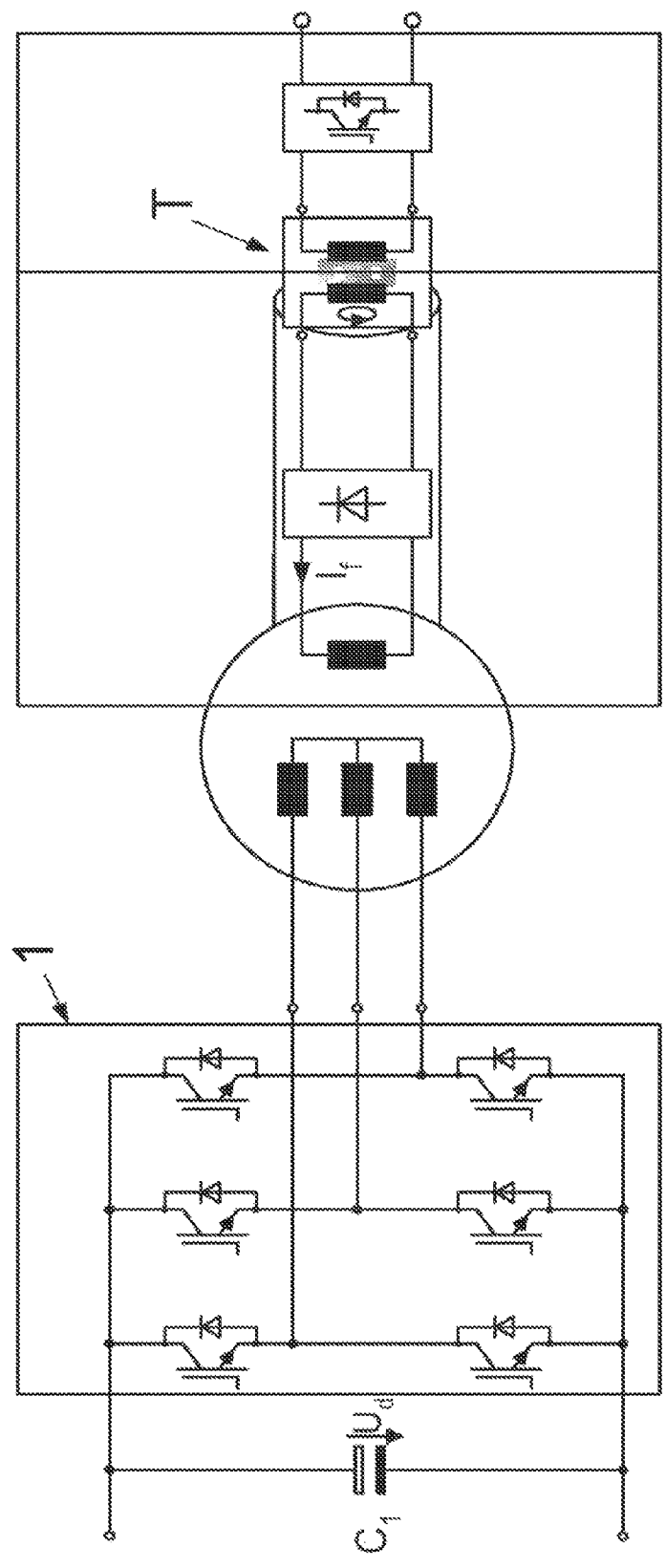
Figure 2:
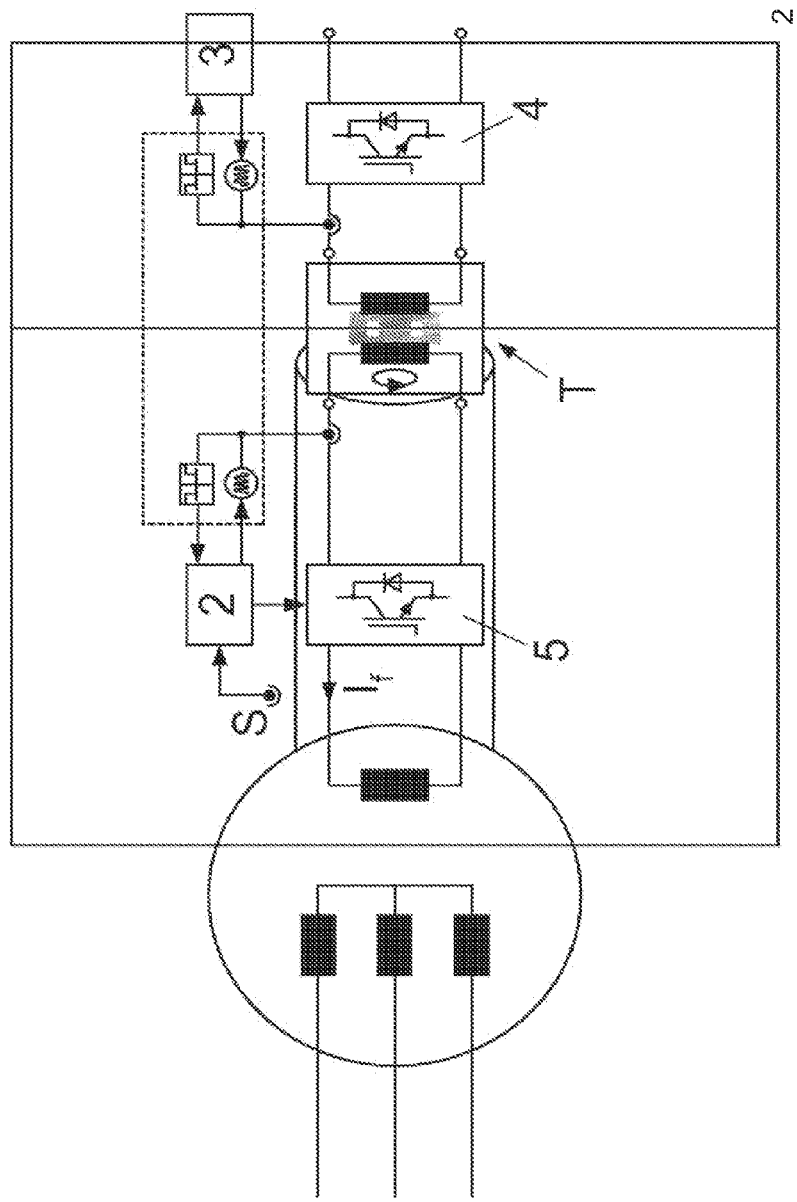

1 Output Stage
C_1 Smoothing Capacitor
T Transformer

(56) References Cited

U.S. PATENT DOCUMENTS

| | | |
|---|---|---|
| 7,348,749 B2 * | 3/2008 | Ide et al. .................. 318/599 |
| 2006/0252370 A1 | 11/2006 | Goossens et al. |
| 2007/0222220 A1 | 9/2007 | Huang et al. |

OTHER PUBLICATIONS

International Preliminary Report on Patentability, issued in corresponding International Application No. PCT/EP2009/003306, 2011.

* cited by examiner

1 Output Stage
C_1 Smoothing Capacitor
T Transformer

2 Control Electronics
3 Control Electronics
4 Power Amplification
5 Controllable Power Controller
S Sensor
T Transformer

SEPARATELY EXCITED ELECTRICAL SYNCHRONOUS MACHINE, AND METHOD FOR OPERATING A SYNCHRONOUS MACHINE

FIELD OF THE INVENTION

The present invention relates to a separately excited electrical synchronous machine, and to a method for operating a synchronous machine.

BACKGROUND INFORMATION

Synchronous machines or synchronous motors which have permanent magnets on their rotor, in particular permanent magnets that are radially magnetized and have an alternate orientation, are already known. The stator of such machines is provided for generating a rotating field.

SUMMARY

Example embodiments of the present invention provide for improved control characteristics in a synchronous machine.

Among features of example embodiments of the present invention in the separately excited electrical synchronous machine are that coil windings, in particular in the form of excitation coils, are disposed at the rotor, the electrical supply of the coil windings being achieved with the aid of an inductive rotation transmitter, whose secondary winding is connected to the rotor and whose primary winding, which is inductively coupled to the secondary winding, is stationary, in particular connected to the stator of the synchronous machine.

This has the advantage that a wear-free supply of the excitation coils is made possible. In addition, an open-loop control or even a closed-loop control of the excitation current from the direction of the primary side is possible in this manner. As an alternative, an open-loop control or even a closed-loop control of the excitation current on the secondary side, i.e., on the rotating component, is possible.

It is also advantageous that very high rotational speeds of up to 20,000 or even 100,000 revolutions per minute are possible, especially at a restricted supply voltage for the output stage.

A direct supply of the output stage from a battery is able to take place.

In addition, the excitation is able to be switched off very rapidly.

Furthermore, it is advantageous that the excitation is able to be switched off, with the result that no-load running losses are able to be reduced.

Another advantage is that the machine is able to be regulated, primarily by varying the excitation and that despite a constant stator current that is advantageously acting in the electrical and thermal configuration of the machine, the machine is thus able to be operated in a broad engine-speed range at an approximately unchanged effective value of the stator voltage, and thus with an unchanged output. This is of special importance for systems in which the optimization of the power consumption and/or output is the objective.

In example embodiments, a capacity is switched to the secondary winding in series or in parallel, such that the associated resonant frequency essentially corresponds to the frequency of the current injected into the primary winding. In this context it is advantageous that high efficiency is achievable even with distance fluctuations, since the distance sensitivity of the efficiency is reduced in the resonant transmission of the energy across the air gap of the rotation transmitter.

In example embodiments, an active or passive rectifier is connected to the secondary winding for the supply of the coil winding with a unipolar current, especially a direct current. In this context it is advantageous that with the implementation of a passive rectifier, the moment of inertia of the rotor is able to be kept low, but the current flowing through the coil windings is controllable nevertheless, especially by controlling or regulating the primary current to a setpoint value. When implementing a controllable rectifier, it is advantageous that the current through the coil windings is able to be controlled or regulated directly, so that high dynamics are achievable in the closed-loop control, notwithstanding the fact that the moment of inertia of the rotor is increased by the controllable components.

In example embodiments, the secondary coil is connected to the input of an AC/DC converter, whose output is connected to the coil windings. In this context, it is advantageous that the flow of energy is able to be influenced. In particular, a current-source-type behavior is able to be converted into a voltage-source-type behavior, so that an easily influenceable actuating variable is able to be realized.

In example embodiments, a sensor for detecting the current flowing through the coil windings, and/or a sensor for recording the rotor temperature are/is provided on the rotor. It is advantageous that an improved closed-loop control is able to be implemented and even changes in parameter values of the system are able to be considered, especially when taking the rotor temperature into account.

In example embodiments, a regulation unit to which the sensor signals are forwarded is mounted on the rotor. In this context it is advantageous that the highest possible dynamics are achievable, because the regulation unit sits directly at the rotor instead of operating indirectly via the rotation transmitter.

In example embodiments, a power switch is disposed on the rotor, especially in order to regulate the current flowing through the coil windings to a setpoint value. In this context it is advantageous that the losses are as low as possible and the control dynamics as high as possible. The switching losses occur directly at the rotating component.

In example embodiments, a device for the demodulation and modulation of current components having a higher frequency are provided, in particular on the rotor. In this context it is advantageous that a reliable data transmission featuring low interference is possible between the rotating and stationary component, without additional wiring.

In example embodiments, the synchronous machine includes a stator winding and a rotor on which coil windings are disposed in the circumferential direction and energized such that radially oriented magnetic fields are able to be generated, which have an alternate orientation in the circumferential direction. In this context it is advantageous that the excitation field is controllable.

In example embodiments, the torque is able to be regulated or controlled at a constant rotational speed.

In example embodiments, the rotor of the synchronous machine and the driven and/or driving, rotatably supported components connected to the rotor have a high moment of inertia such that the torque is able to be varied more rapidly than the rotational speed, especially at a rate of change that is at least ten times faster. In this context it is advantageous that the torque is variable very rapidly, so that, for example, a torque generated by the synchronous machine is able to be added to the output torque of an internal combustion engine, the engine speed of the internal combustion engine having high inertia and thus appearing as constant on the time scale of the torque change. Instead of an internal combustion engine, some other device having a high moment of inertia such as a rotating mass may be used as well.

Among features of the method are that coil windings provided on the rotor are supplied with the aid of an inductive rotation transmitter, the current flowing through the coil windings of the rotor being controlled or regulated to a setpoint value.

In this context it is advantageous that a direct and rapid influencing of the torque-generating quantity is able to be implemented and a high dynamic response in the closed-loop control is achievable as a result.

In example embodiments, a voltage provided on the primary or secondary side is used as actuating variable. This offers the advantage of allowing the use of an easily implemented actuating variable.

In example embodiments, the current flowing through the coil windings of the rotor, and/or the rotor temperature are/is recorded. In this manner, an especially high control quality and dynamic response are advantageously able to be achieved.

In example embodiments, the engine speed of the rotor is substantially constant. This has the advantage that the torque is able to be influenced directly via the excitation current in the coil windings of the rotor.

In example embodiments, the rate of change of the rotational speed is lower than the rate of change of the actuating variable, the nominal values being related to the rated parameter values of the machine, in particular. In this context it is advantageous that the torque is variable very rapidly and thus transmittable at a constant engine speed, for example, to be added to a torque produced by another machine. For this purpose, the rotor shaft is able to be mechanically coupled or to be directly connected to the driven shaft of an internal combustion engine.

LIST OF REFERENCE CHARACTERS

1 output stage
2 control electronics
3 control electronics
4 power amplification
5 controllable power controller
C_1 smoothing capacitor
M electromotor
S sensor
T transformer

DETAILED DESCRIPTION

Example embodiments of the present invention will now be explained in greater detail with reference to figures.

A device according to an example embodiment of the present invention is shown schematically in FIG. 1.

An output stage 1, which includes three half-bridges, each having a series connection of power switches, is supplied from a unipolar voltage applied at smoothing capacitor C_1. Output stage 1 supplies the stator windings of the synchronous motor. A diode is also connected in parallel to each power switch.

The output stage is able to transport energy from the capacitor to the stator windings, and from the stator windings to the capacitor.

An angle sensor for detecting the angular position of the rotor of the synchronous motor is provided at the synchronous motor. The switches of output stage 1 are clocked as a function of the detected angular position, in particular in synchrony. A block commutation is preferably implemented.

Instead of permanent magnets, coil windings are provided on the rotor of the synchronous motor, which generate a substantially radially directed field. The main difference from a synchronous motor having permanent magnets is that the field generated by the coil windings is able to be controlled.

The supply of the coil windings takes place from the secondary coil of an inductive rotation transmitter, which also includes a primary winding that is inductively coupled with the secondary coil; however, the secondary coil is mounted on the rotor, i.e., is supported so as to be rotatable relative to the stationary primary coil. In electrotechnical terms, the rotation transmitter thus corresponds to a simple transformer T. The low rotational speed in comparison with the speed of light has the effect that no dependency of the transmitted output from the rotational speed arises. Thus, the efficiency of the rotation transmitter as such is essentially the same at standstill and at rotational speeds of up to 100,000 revolutions per minute.

Preferably, a medium-frequency current, which has a frequency between 10 and 500 kHz, especially 10-30 kHz, is impressed upon the primary side. A capacity is then connected in series or parallel to the secondary coil, which capacity is dimensioned such that the associated resonant frequency substantially corresponds to the medium frequency of the current on the primary side.

Control electronics 2 are also connected to the secondary coil on the rotor. Control electronics 3 is connected to the primary coil. Control electronics 2 and control electronics 3 each include means for modulating and demodulating current components of higher frequencies. Thus, information is transmittable also bidirectionally via the inductive rotation transmitter. That is to say, sensor signals acquired on the rotating component or corresponding information are therefore also transmittable to the stationary component in a contactless manner.

Also disposed on the rotor, i.e., the rotating component of electromotor M, is a sensor S, which detects at least the current provided for the coil windings of the rotor. The coil windings are operated using a unipolar voltage, which is generated from a controllable power controller 5, which is supplied by the secondary coil.

Also provided on the primary side, for the supply of the primary coil of the inductive rotation transmitter, is a power amplification 4, which is controllable.

In this manner, the current supplied to the coil windings is able to be controlled or even regulated when taking the current values recorded by sensor S into account. In this context, the control unit may be provided integrated in control electronics 2 and/or 3.

The stator windings of electromotor M are implementable as three-phase winding according to conventional arrangements. In any event, they are implemented such that a rotating field is able to be generated in the region of the rotor.

The rotational speed of the motor may amount to more than 20,000 revolutions, in particular up to 100,000 revolutions per minute. Even higher rotational speeds are advantageously able to be achieved.

According to example embodiments of the present invention, the motor is operated and/or regulated such that the rotational speed is kept substantially constant and the torque is regulated to a setpoint value. The rotational speed is kept constant by the load to be driven connected to the rotor. This load is implemented with a high moment of inertia, for example, and/or as shaft driven by an internal combustion engine.

The output stage is operated via block clocking, so that the frequency of the block-type output voltage on the motor side corresponds to the electrical stator frequency, and the associated effective value is directly proportional to the voltage at capacitor C_1.

Because the angular position of the rotor is acquired with the aid of an angle sensor, the switches are switched in a simple manner as a function of the individual angular value.

Instead of the torque, the motor current is detectable as actual value, especially while detecting the current acquired by sensor S in addition. The block-commutated voltage supplying the stator of the motor is likewise able to be taken into account.

The voltage injected at the rotation transmitter on the primary side can be used as actuating variable.

That is to say, a closed-loop torque control is realizable in this manner, the value of the torque being variable very rapidly. For even if the voltage applied at the stator and also the stator current are varied only slowly or not at all, and also the specified rotational speed, a variation of the current flowing in the coil groups of the rotor is variable in a rapid manner and to a significant extent nevertheless. In other words, the response time of the system is very short.

The regulation unit is able to be integrated into control electronics 2, the values detected by sensor S likewise being transmitted to this regulation unit. Preferably, the torque regulation is provided as a closed-loop control superposed to a current regulator, the current regulator regulating the excitation current on the rotating rotor shaft, or alternatively, the stator current, to a setpoint value.

The intermediate circuit voltage, from which the output stage including controllable power switches 5 is supplied, is preferably kept constant.

Not shown in the FIGURE is a sensor for recording the stator current and a sensor for detecting the intermediate circuit voltage, whose detected measured values are also supplied to the regulation unit.

The de-excitation of the excitation coils, i.e., the coil windings, takes place via resistors to which the associated current is supplyable by control circuit elements.

In additional exemplary embodiments, a reversal of the polarity of the unipolar voltage is controllable as well. In particular in an operation as generator, it is therefore possible to use an active rectifier on the rotating rotor shaft in an advantageous manner.

In exemplary embodiments, instead of the three-phase arrangement of the output stage and the electromotor shown in FIG. 1, a higher-phased output stage is realized. For example, even a six-phase arrangement of the output stage and the electromotor is advantageously able to be provided.

In exemplary embodiments, the alternating current supplied on the secondary side in this manner is transformed into a unipolar current with the aid of an uncontrolled rectifier. In this manner, the coil windings are acted upon by a current whose value is controllable by the current predefined on the primary side.

In exemplary embodiments, the current supplied on the secondary side by the secondary coil of the rotation transmitter featuring the capacitance connected in series or parallel, is forwarded to a current-voltage converter. For instance, this current-voltage converter is able to be realized by a quadripole network, which therefore is supplied in the manner of a current source and features a voltage-source-type behavior on the output side and which supplies the coil windings. This makes it possible to control the supply voltage for the coil windings by regulating the current available on the primary side to a particular value. The current-voltage converter is realized as quadripole network made up of passive components such as inductances and capacitances.

In exemplary embodiments, a current regulator is disposed on the secondary side, i.e., on the rotating rotor shaft, which is connected to a sensor for recording the current flowing through the coil windings. Thus, this acquired current value is able to be regulated to the desired setpoint value with the aid of an active rectifier, i.e., a rectifier implemented with controllable semiconductor switches, the setpoint value being transmitted by a contactless data transmission, preferably by the modulation of higher-frequency current components, via the rotation transmitter. Although the electronic components required for the current regulator and sensor increase the moment of inertia, they nevertheless allow a regulation of the excitation current and thus also a regulation of the torque. An especially precise attainment of the setpoint value is able to be realized with the aid of the closed-loop control.

Through the direct influencing of the excitation current, the excitation current quickly reaches the setpoint value, and the speed ripple is able to be kept at a low level.

Although the increased moment of inertia does indeed reduce the dynamics of the entire system, it nevertheless comes as a surprise that, overall, the direct influencing makes it possible to achieve higher speed in the torque regulation. For the current regulated on the rotor determines the torque of the electromotor to a substantial degree.

In exemplary embodiments, not only the current flowing through the coil windings is detected, but also the rotor temperature. Thus, even instantaneous parameters of the controlled system are known and the closed-loop control can be improved even further.

In exemplary embodiments, the torque of the rotor is detected as well, in particular on the rotating rotor shaft, and taken into account in the closed-loop control, which makes it possible to improve the closed-loop control.

In exemplary embodiments, the information is transmittable only unidirectionally, i.e., from the primary side to the secondary side and vice versa. Thus, weight may be saved on the rotating component, where, for example, only the sensor signals are transmitted as information to the primary side.

In exemplary embodiments, a rectifier instead of controllable power controller 5 is used on the primary side.

In exemplary embodiments, a restricted or fixedly specified voltage source, such as a battery, is used as unipolar voltage applied at smoothing capacitor C_1.

The invention claimed is:

1. A separately excited electrical synchronous machine, comprising:
   coil windings arranged at a rotor;
   an inductive rotation transmitter adapted to provide an electrical supply to the coil windings, the inductive rotation transmitter including secondary winding connected to the rotor and a stationary primary winding inductively coupled to the secondary winding;
   wherein a capacity is switchable in one of (a) series and (b) parallel to the secondary winding, such that an associated resonant frequency substantially corresponds to a frequency of a current injected into the primary winding.

2. The synchronous machine according to claim 1, wherein the coil windings are arranged as excitation coils.

3. The synchronous machine according to claim 1, wherein the primary winding is connected to a stator of the synchronous machine.

4. The synchronous machine according to claim 1, wherein one of (a) an active and (b) a passive rectifier is connected to the secondary winding to at least one of (a) supply the coil winding with a unipolar current and (b) supply the coil winding with an alternating current having a temporal average value that does not vanish, an average value being formed across a time period of the alternating current.

5. The synchronous machine according to claim 4, wherein the unipolar current is a direct current.

6. The synchronous machine according to claim 1, wherein the secondary coil is connected to an input of a current converter, whose output is connected to the coil windings.

7. The synchronous machine according to claim 6, wherein the current converter is arranged as an AC/DC converter.

8. The synchronous machine according to claim 1, wherein the rotor includes at least one of (a) a sensor adapted to detect a current flowing through the coil windings and (b) a sensor adapted to record a rotor temperature.

9. The synchronous machine according to claim 1, wherein the rotor includes a regulation unit to which sensor signals are forwarded.

10. The synchronous machine according to claim 1, wherein the rotor includes at least one power switch.

11. The synchronous machine according to claim 10, wherein the power switch is adapted to regulate a current flowing through the coil windings to a setpoint value.

12. The synchronous machine according to claim 1, further comprising a demodulation/modulation device adapted to demodulate and modulate additional signal current components.

13. The synchronous machine according to claim 12, wherein the additional signal current components include higher frequency current components.

14. The synchronous machine according to claim 1, wherein the synchronous machine includes a stator winding and a rotor on which coil windings are disposed in a circumferential direction and energized such that radially oriented magnetic fields are generatable, which are alternately oriented in the circumferential direction.

15. The synchronous machine according to claim 1, wherein the rotor of the synchronous machine and at least one of (a) driven and (b) driving, rotatably supported components connected to the rotor include a sensor.

16. The synchronous machine according to claim 1, wherein a torque of the synchronous machine variable more rapidly than a rotational speed.

17. The synchronous machine according to claim 16, wherein a rate of change of the torque is at least ten times faster than the rotational speed.

18. A method for operating a synchronous machine, comprising:
supplying coil windings provided on a rotor by an inductive rotation transmitter; and
at least one of (a) controlling and (b) regulating current flowing through the coil windings of the rotor to a setpoint value;
wherein a capacity is switchable in one of (a) series and (b) parallel to a secondary winding, such that an associated resonant frequency substantially corresponds to a frequency of a current injected into a primary winding.

19. The method according to claim 18, wherein at least one of (a) a voltage provided on one of (i) a primary side and (ii) a secondary side and (b) a voltage characteristic provided on one of (i) the primary side and (ii) the secondary side is used as actuating variable.

20. The method according to claim 18, wherein at least one of (a) a voltage provided on one of (i) a primary side and (ii) a secondary side and (b) a voltage characteristic provided on one of (i) the primary side and (ii) the secondary side is used as actuating variable in at least one of (a) a pulse-width modulation method and (b) a pulse-code modulation method.

21. The method according to claim 18, further comprising recording at least one of (a) the current flowing through the coil windings of the rotor and (b) a rotor temperature.

22. The method according to claim 18, wherein a rotational speed of the rotor is substantially constant.

23. The method according to claim 18, wherein a rate of change of a rotational speed is less than a rate of change of an actuating variable, nominal values being related to rated parameter values of the machine.

* * * * *